INVENTOR
Roger Boutron
By
Sparrow and Sparrow
ATTORNEYS

United States Patent Office 3,438,250
Patented Apr. 15, 1969

3,438,250
PROCESS AND DEVICE FOR MEASURING THE COMPACTNESS OF COMPRESSIBLE BODIES AND ESPECIALLY OF CIGARETTES
Roger Boutron, Saran, France, assignor to Service d'Exploitation Industrielle des Tabacs et des Allumettes, Paris, France, a French public establishment
Filed Mar. 25, 1966, Ser. No. 537,512
Claims priority, application France, Mar. 26, 1965, 10,853
Int. Cl. G01n 3/08
U.S. Cl. 73—94    2 Claims

ABSTRACT OF THE DISCLOSURE

A device for measuring the resistance to compression of compressible bodies by determining the amount of compression under a certain load. A method for measuring the resistance to compression of a group of compressible bodies by successively applying a first light static pressure to the bodies for establishing an initial position as a "zero line" and then a second predetermined static pressure load which is higher than the first one, and by measuring the elastic deformation of the bodies under the second load.

---

Figure 2:
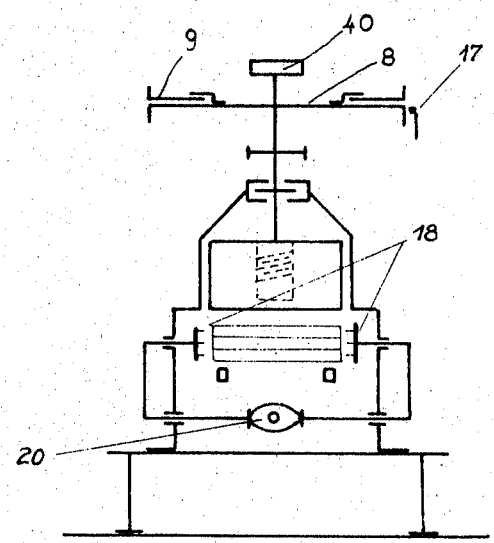

The present invention has for its object a "compactness meter" or instrument which is designed to give in a very short time the index of "compactness" of a compressible body or group of compressible bodies. This instrument can be employed especially for the purpose of measuring the compactness of cigarettes and also for measuring other physical characteristics.

The concept of compactness is still not clearly defined. In the spirit of the present invention, compactness is considered qualitatively as a potentially measurable value which characterizes the quality of filling of a cigarette for a given weight of tobacco. Correlatively, this value is related to the quantity of tobacco contained in the cigarette for a given subjective "feel" of compactness or extent of filling.

Compactness meters are already known which are based on mechanical measurements. Certain meters operate under constant load and measure the degree of compression obtained under said load after a given period of time. As in the case of compactness meters of the compression fluid type, other compactness meters measure the compression which is produced as a result of uniform pressure exerted on the entire surface of the cigarette and, more specifically, the variation in volume to which the cigarette is subjected under this pressure over a predetermined period of time.

This invention is directed to a method for measuring the resistance to compression of a compressible body or group of compressible bodies, characterized in that the flattening by compression, or the deformation, of the body or group of bodies under an effort which is distributed over said body or bodies is measured when the elastic reaction of said body or bodies reaches a predetermined value.

The mode of operation will advantageously be as follows:

The body is subjected to a light pressure of predetermined value whereby said body is not compressed but caused to assume an initial position and shape such as to determine a value which will be referred to as the "compression zero," whereupon the body is subjected to a given pressure which is higher than the initial pressure and which is such as to ensure that the body retains all of its elasticity, the degree of compression of said body being then measured starting from said "compression zero."

Another object of this invention is to provide a device for the practical application of the method hereinabove described, wherein said device comprises a means for housing the body whose compactness is to be measured, a balance whose beam is capable of receiving at one end the body which is contained in its housing means and, at the other end, two successive predetermined weights, means for exerting a variable pressure on said body and means for measuring the compression of said body.

In a preferred form of embodiment, the means for exerting a pressure on the body comprise a plunger which is movable at right angles to the beam of the balance, and the compression-measuring means are means for measuring the travel of said plunger.

The plunger can be made integral with a nut which is rigidly fixed for rotation and which is adapted to cooperate with a screw which is rigidly fixed for translational motion and the means for measuring the travel of the plunger are in that case means for measuring the angle of rotation of the screw.

In order to eliminate the secondary effects of elastic reaction of the complete assembly of the body or bodies, the means for housing the body can consist of a tray having inwardly-sloping walls.

By means of the device referred-to above, the light initial pressure is exerted by causing the plunger or ram to move downwards until the equilibrium of the balance which was upset under the action of the first weight applied is restored, whereupon the higher pressure is exerted by causing the plunger or ram to continue to move downwards until the equilibrium which is again upset under the action of the second weight is in turn restored.

There can be associated with the above device, on the one hand, means for measuring certain physical characteristics of the products being tested such as moisture content and, on the other hand, means for correcting the gross compression and, finally, automatic control and safety means.

One form of embodiment of the device according to the invention is illustrated in the accompanying drawings by way of example without implied limitation, said device being intended for the purpose of measuring the compactness of cigarettes.

Figure 1:
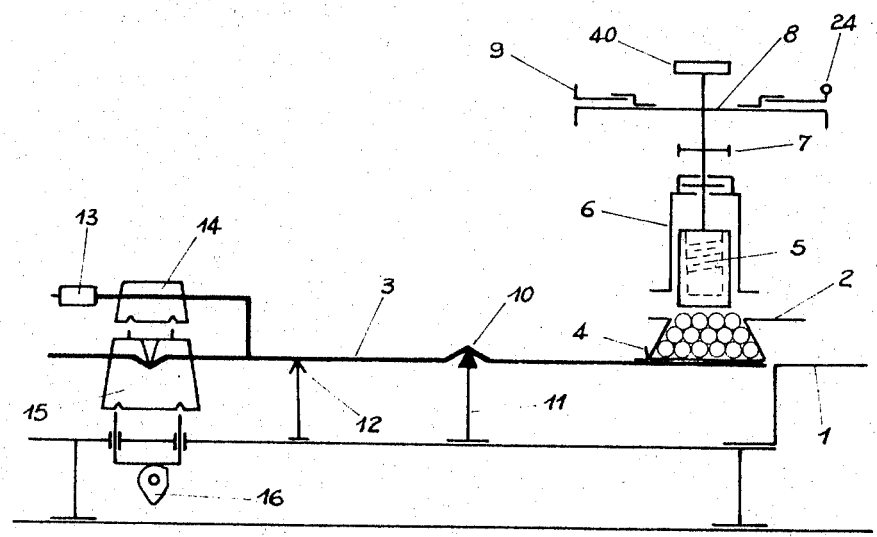
Figure 3:
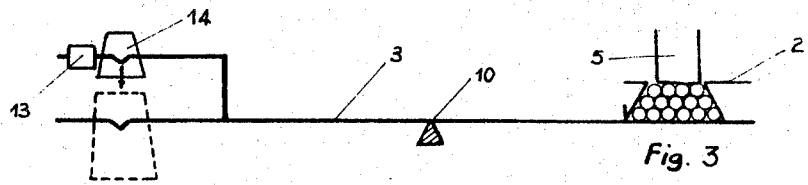
Figure 4:
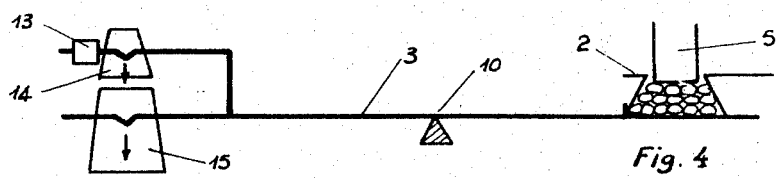
Figure 5:
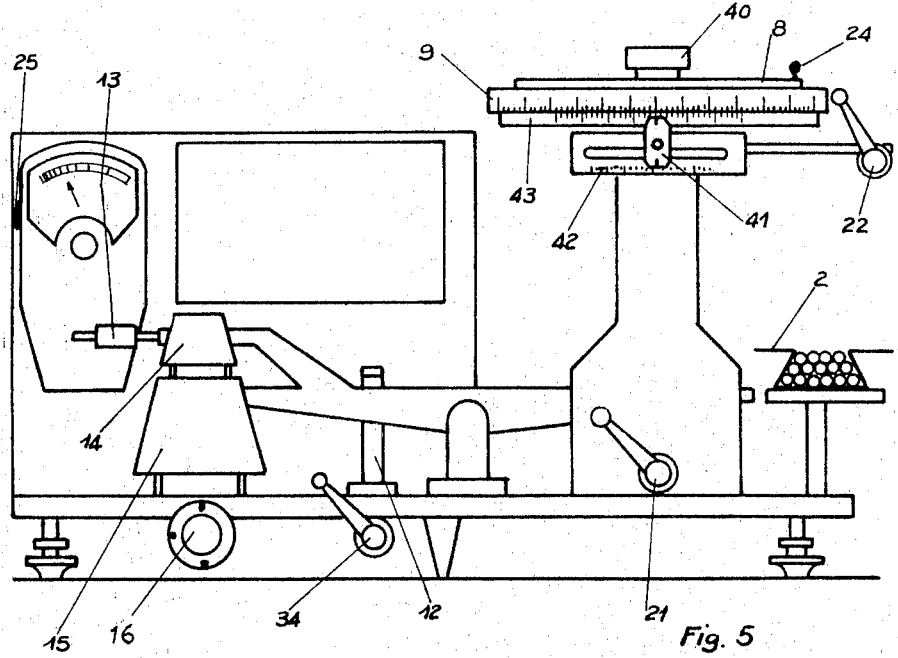
Figure 6:
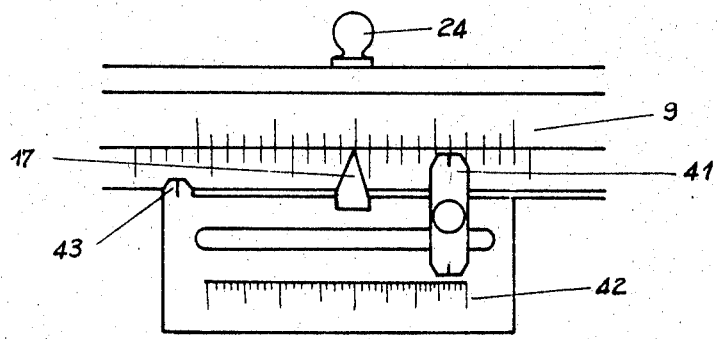
Figure 7:
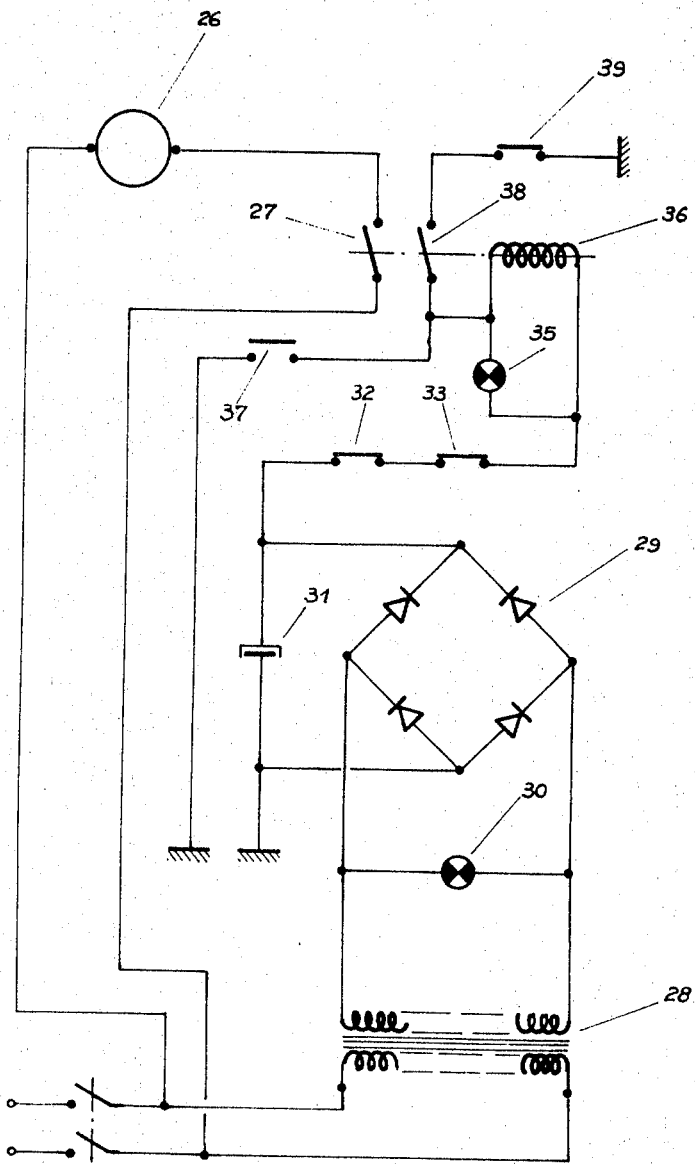

In these drawings:
FIG. 1 is a diagrammatic view in front elevation of the device according to the invention;
FIG. 2 is a view in side elevation of the device of FIG. 1;
FIGS. 3 and 4 are diagrams of position of the balancing and pressure devices at different stages of operation;
FIG. 5 is a general view of the apparatus of FIGS. 1 and 2 in a non-diagrammatic form;
FIG. 6 is a detail view on a larger scale showing the zero-resetting slide system;
FIG. 7 is a diagram of the electric control and safety circuit.

In the example which is shown in the drawings, the cigarettes to be tested are housed in groups of fifteen in three superposed layers of six, five and four cigarettes respectively in a tray 2.

The tray 2 has walls which slope inwards from the base with a view to reducing wall effects as far as possible. The tray is dimensioned according to the modulus of the cigarettes to be measured.

The apparatus proper is made up of the following elements:

A separate loading ramp 1 which is disposed in the horizontal plane of the end of a weighing beam 3 in the locked or arrested position thereof serves to convey to the apparatus the tray 2 which has previously been filled with cigarettes. Abutments 4 are arranged so as to position said tray beneath and in the axis of a ram 5.

The ram 5 is made up of a prismatic nut which is adapted to move between guides 6; the motion of said ram is produced by a screw which is rigidly fixed for translational motion and driven by means of a pinion 7, either manually from the control knob 40 or mechanically from a braking motor (which has not been shown in the drawings) and which produces stoppage as soon as the equilibrium of the beam 3 is upset in the direction of the pressure exerted by the ram.

The pitch of the screw is such that the compression is produced by means of less than one full revolution of the hand-wheel 8.

A graduated disc 9 which is integral with the top portion of the hand-wheel 8 but which is nevertheless capable of being displaced manually with respect to said hand-wheel serves to record the angular displacements of the screw as said disc moves in front of a stationary pointer 17. Said disc 9 is provided with graduations which make it possible to record very small displacements.

The beam 3 rests on knife edges 10 mounted on a column 11 close to which is placed on the weight side a horizontality and contact stop 12. The two arms of the beam are unequal in order to amplify the displacements on the weight side and to reduce the volume of these latter. In the exemplified embodiment, said arms are respectively 100 and 140 mm. in length. The ends of the beams are fork-shaped: at the end located opposite the tray in order to receive said tray and, at the weight end, in order to receive the weights 14 and 15 in two stages; said weights can be either raised or lowered by means of the operating mechanism 16. A sliding tare 13 is mounted at the weight end of the beam.

Brass plates 18 provided with pins are located opposite each open end of the tray. An operating mechanism 20 serves to actuate the pins so that these latter penetrate within the open ends of the tray. Each brass plate is connected to the terminals of a ohmmeter. A measurement of the moisture content of the cigarettes is supplied by a table drawn up according to the logarithm of the resistance as a linear function of the moisture content.

The semi-automatic control and safety circuit comprises a first element for supplying current to the motor 26 which actuates the ram 5 and connected in series with a contact 27. The second element comprises a transformer 28, a rectifier 29 connected in parallel with a signal lamp 30, a capacitor 31 between ground (earth) and the circuit to be supplied, two series-connected contacts 32 and 33 which are coupled respectively with the pin-operating mechanism 20 and the beam arresting lever 34, said contacts being closed in the inoperative position of the pins and in the beam-release position, a parallel-connected signal lamp 35 and a supply circuit to the relay coil 36, said circuit being then connected to ground (earth) via two channels, wherein one channel comprises a contact 37 which is connected to the clutch unit of the motor and which is open in the engaged position of the motor, whilst the other channel comprises a contact 38 which can be closed as in the case of the contact 37 by energizing the relay coil 36 and, finally, a contact 39 which corresponds to the contact between the horizontality stop 12 and the beam 3.

The electric control of the motor is so designed as to prevent the occurrence of any fault conditions and to forestall any errors of operation.

From the diagram, it is apparent that the relay coil 36 which controls the motor 26 can be energized only on condition that:

The beam has been released (thus preventing any stress from being exerted on an arrested beam);

The pins 18 are in the inoperative position (thus preventing any movement of the ram if the pins have inadvertently been left in the work position).

Moreover, as a result of the combination of the main make-and-break contact 37 which is connected to the clutch unit and the self-supply contact 38 which is connected in series with the contact 39 for detecting the equilibrium of the beam, the motor can be started up simply by releasing the clutch unit and can immediately be stopped as soon as the equilibrium is upset without any possibility of starting up again unless the clutch unit is first released.

The arrangement described above prevents in particular the following fault condition:

When the cigarettes are compressed at the end of the measurement, with the result that their elastic reaction counterbalances the action of the weights, the equilbrium is upset and the motor is brought to a standstill as a result of the opening of the self-supply contact.

As a result of deformation of the material under stress, the beam falls back rapidly, thereby closing the contact again. However, the motor cannot again be set in motion as long as the clutch unit has not been released, and this operation can alone permit the reclosure of the main contact and the self-supply contact.

The apparatus therefore remains immobilized in the position which it has at the moment of upsetting of the equilibrium. It is this position which corresponds to the measurement.

The operation of the apparatus is as follows:

The end of the beam having been previously calibrated by a sliding weight 13 which corresponds to the maximum weight of the tray 2 when full, said tray is filled with the batch of fifteen cigarettes which are disposed in three layers made up respectively, from the bottom upwards, of six, five and four cigarettes. By means of the loading ramp 1, said tray is brought into contact with the abutments 4 on the end of the beam 3 beneath the ram 5 and on the axis thereof. The weight 14 is then placed on the other end of the beam by means of the operating mechanism 16. In the example considered, the weight adopted was equal to 72 grams.

The beam is released by means of the operating lever 34 (as shown in FIG. 6), the motor being disengaged. The contacts 32 and 33 being thus closed, the motor is started up by closing the contact 27 under the action of the coil 36. The motor is engaged by means of the operating lever 22. The screw is set in motion and the ram moves downwards since the contact 38 is also closed. The ram comes into contact with the cigarettes and comes to a standstill at the point of equilibrium of the beam as soon as the contact between this latter and the stop 12 is opened.

The motion of the screw is stopped instantaneously as a result of the instantaneous stoppage of the built-in braking motor and the graduated disc 9 comes to a standstill. The motor is disengaged by means of the operating lever 22 as soon as the disc stops.

The disengagement of the motor has the effect of closing the contact 37 which will permit re-starting of the motor.

The initial pressure thus applied is intended solely to eliminate various influences which are independent of compactness (cigarettes which are more or less correctly placed in the tray or cigarettes which are either ovalized or deformed), the zero of the graduated disc 9 is brought back in front of the stationary pointer 17 by means of the operating knob 24. The weight 15, (the weight chosen in the example considered being 625 grams), is placed in position on the beam by means of the operating mechanism 16; at the same time, the motor is engaged by means of the operating lever 22.

The ram moves downwards until the contact between the beam and the stop 12 is again opened; the motor stops immediately as well as the graduated disc. The stationary pointer 17 indicates on the graduated disc the gross value of compression.

The motor is then disengaged by means of the operating lever 21 (shown in FIG. 6), the pins 18 are inserted in the ends of the cigarettes and the ohmmeter 25 is connected into circuit so as to read off the resistance and determine the corresponding moisture content.

The moving pointer 41 for moisture content correction is brought to the position corresponding to the value which is found on the scale 42. The value indicated by the top portion of the pointer on the graduated disc 9 is the corrected value of compression.

The pins 18 are withdrawn by operating the hand lever 21; the beam is arrested by means of the lever 34 and then relieved of the weight 15, the ram is moved upwards by means of the knob which produces the rotation of the screw 40, the tray is then removed and emptied.

The apparatus which has just been described can also be employed for the purpose of measuring the diameters of cigarettes.

As can be seen from FIG. 7, the hand-wheel 8 is provided with a scale 43 for measuring diameters.

The measurement of the diameter is taken after the initial downward motion of the ram which comes into contact with the cigarettes.

It is possible by calculation to establish that the difference in height of the top layer of cigarettes within the tray, in the case of a variation in diameter which is equal to one tenth of a millimeter, is 0.35 mm.

This value corresponds to the dimensions of the tray of the example herein described, within the range of diameters considered.

Under these conditions, and since the level which should be reached within the tray by fifteen cigarettes having a given theoretical diameter is known, it is therefore possible to read off the actual diameter of said cigarettes from a suitably disposed scale.

In the case of a ram having a screw pitch of $x$ mm., the ram moves down over a distance of $x$ mm. when the disc carried by said screw has performed one revolution.

In order to measure to one hundredth of a millimeter, the periphery of said disc is divided into $100\,x$ equal parts.

On the scale of the diameters, each of the graduations expressed in hundredths of a millimeter is therefore separated by an interval of:

$$\frac{\text{length of the periphery of the disc} \times 0.35}{x \times 10}$$

The values of diameter are located on the scale of the disc 9 in such manner that the pointer is placed opposite the nominal value when the ram is located in the position corresponding to the height of the group of cigarettes having the diameter considered.

The apparatus makes it possible not only to measure the compactness, the mean diameter of cigarettes as well as the moisture content but also, for example, to measure the filling of cigarette ends at any predetermined moment of the cycle by replacing the moisture-detection pins by suitably arranged feelers.

What I claim is:

1. A device for measuring the resistance to compression of compressible bodies, comprising means for holding a group of said bodies, a balance having a beam, said balance adapted to receive at one end of said beam said holding means and adapted at the other end of said beam to carry permanently a first predetermined weight and further to receive temporarily a second predetermined weight, means for exerting successively pressures on said group of bodies, said pressures balancing said first weight and said second weight, respectively, and means for measuring the flattening of said group of bodies beyond the position corresponding to said first weight to the position corresponding to said second weight.

2. A device according to claim 1, said compressible bodies consisting of cigarettes and said holding means consisting of a tray having inwardly sloping lateral walls providing a proper positioning of said cigarettes in both their initial and their final position, said sloping walls eliminating secondary effects of elastic reaction of said cigarettes.

References Cited

UNITED STATES PATENTS

| 1,839,376 | 1/1952  | Cropper      | 73—94 X |
| 2,338,070 | 12/1943 | Lopez.       |         |
| 2,407,591 | 9/1946  | Walley et al.| 73—161  |
| 2,706,404 | 4/1955  | Schiesel     | 73—93   |
| 3,321,961 | 5/1967  | Boeuf et al. | 73—103  |
| 1,762,497 | 6/1930  | Wilson       | 73—83   |
| 2,938,377 | 5/1960  | Sklar        | 73—83   |

FOREIGN PATENTS 971,228   9/1964   Great Britain.

OTHER REFERENCES

The Exact Weight Shadowgraph, Type 4212, The Exact Weight Scale Co.

CHARLES A. RUEHL, *Primary Examiner.*

U.S. Cl. X.R.

73—83